(12) United States Patent
Yao et al.

(10) Patent No.: US 9,457,856 B2
(45) Date of Patent: Oct. 4, 2016

(54) MULTI-VEHICLE MODEL COLLINEAR FLEXIBLE FRAMING SYSTEM

(71) Applicant: GUANGZHOU MINO AUTOMOTIVE EQUIPMENT CO., LTD, Guangzhou (CN)

(72) Inventors: Weibing Yao, Guangzhou (CN); Peter Chihcheng Sun, Guangzhou (CN); Meng Yang, Guangzhou (CN); Wei He, Guangzhou (CN); Yi He, Guangzhou (CN); Kai Zhou, Guangzhou (CN); Hai Huang, Guangzhou (CN)

(73) Assignee: GUANGZHOU MINO AUTOMOTIVE EQUIPMENT CO., LTD., Guangzhou (CN)

( * ) Notice: Subject to any disclaimer, the term of this patent is extended or adjusted under 35 U.S.C. 154(b) by 109 days.

(21) Appl. No.: 14/372,615

(22) PCT Filed: Feb. 4, 2013

(86) PCT No.: PCT/CN2013/071328
§ 371 (c)(1),
(2) Date: Jul. 16, 2014

(87) PCT Pub. No.: WO2014/026475
PCT Pub. Date: Feb. 20, 2014

(65) Prior Publication Data
US 2015/0001279 A1    Jan. 1, 2015

(30) Foreign Application Priority Data

Aug. 13, 2012  (CN) .......................... 2012 1 0285218

(51) Int. Cl.
*B23K 37/00*  (2006.01)
*B62D 65/00*  (2006.01)
(Continued)

(52) U.S. Cl.
CPC ............. *B62D 65/022* (2013.01); *B23K 37/04* (2013.01); *B62D 65/024* (2013.01); *B65G 35/00* (2013.01)

(58) Field of Classification Search
None
See application file for complete search history.

(56) References Cited

U.S. PATENT DOCUMENTS

| 4,162,387 A | 7/1979 | De Candia |
| 4,744,500 A * | 5/1988 | Hatakeyama .......... B62D 65/02 228/4.1 |

(Continued)

FOREIGN PATENT DOCUMENTS

| CN | 201405169 Y * | 2/2010 |
| CN | 101934445 A | 1/2011 |

(Continued)

OTHER PUBLICATIONS

International Search Report of corresponding PCT Application No. PCT/CN2013/071328 mailed on May 23, 2013.

*Primary Examiner* — Devang R Patel
(74) *Attorney, Agent, or Firm* — M&B IP Analysts, LLC

(57) ABSTRACT

A multi-vehicle type co-production line flexible framing is disclosed, comprising a robot welding system, a high speed transport system, a floor panel intelligent flexible positioning system, and a side panel flexible positioning and switching system. The floor panel intelligent flexible positioning system is correspondingly connected to a transfer rail of the high speed transport system. The side panel flexible positioning and switching system comprises a side panel fixture consolidation system, a fixture storage system, and a fixture switching and rail system. The side panel fixture consolidation system corresponds to the side of the floor panel intelligent flexible positioning system. The fixture storage system is arranged on two sides of the side panel fixture consolidation system in the transfer direction of the high speed transport system. The fixture switching and rail system is connected between the side panel fixture consolidation system and the fixture storage system. The improved structure is relatively compact and practical, has a short switching time, a high production efficiency, and a small floor area, and may use a large number of welding robots, fully satisfying the capacity requirement of 60JPH of the automobile factory.

6 Claims, 3 Drawing Sheets

(51) Int. Cl.
*B62D 65/02* (2006.01)
*B23K 37/04* (2006.01)
*B65G 35/00* (2006.01)

(56) References Cited

U.S. PATENT DOCUMENTS

| | | | | |
|---|---|---|---|---|
| 5,319,840 A * | 6/1994 | Yamamoto | ............. | B62D 65/02 29/430 |
| 5,518,166 A * | 5/1996 | Numata | ................ | B23P 21/004 228/182 |
| 6,336,582 B1 * | 1/2002 | Kato | ....................... | B62D 65/02 228/102 |
| 6,339,204 B1 * | 1/2002 | Kato | ................... | B23K 11/3063 219/86.24 |
| 6,344,629 B1 * | 2/2002 | Kato | ....................... | B62D 65/02 218/147 |
| 2012/0110838 A1 * | 5/2012 | Kang | .................... | B61B 13/127 29/824 |

FOREIGN PATENT DOCUMENTS

| | | |
|---|---|---|
| CN | 102528366 A | 7/2012 |
| CN | 102837138 A | 12/2012 |
| CN | 202804503 U | 3/2013 |
| EP | 1074460 B1 | 2/2001 |
| SE | 423979 B | 6/1982 |

\* cited by examiner

MULTI-VEHICLE MODEL COLLINEAR FLEXIBLE FRAMING SYSTEM

FIELD OF THE INVENTION

The present invention relates to a consolidation station on a production line of welding the automobile body in white, and in particular, relates to a multi-vehicle type co-production line flexible framing suitable for multiple vehicle types to use in common, belonging to the field of automobile manufacturing equipment.

BACKGROUND OF THE INVENTION

The future automobile is developing in the trend of many varieties, small batch, and high capacity. According to this trend, it is impractical to establish a new production line for each vehicle type, so producing multiple vehicle types simultaneously on one production line is the trend of future automobile equipment industry. The multi-vehicle type co-production line flexible framing may accomplish the welding of the floor assembly, the left side panel assembly, the right side panel assembly, and the roof assembly of the body in white, and is the core equipment on the automobile body in white flexible production line.

At present, the multi-vehicle type co-production line flexible framing applied by major domestic automobile factories is basically imported from abroad or provided directly by foreign-funded enterprises. Domestic enterprises have a weak competitive power in this filed, even though there are some defects in several foreign flexible framing solutions, such as a large floor area, a slow production beat, incapability of switching with the line, restrictions on the co-production line vehicle types, or a high building cost, and it cannot satisfy the production requirement of the domestic automobile factories very well, and brings a large impact to the progress of our automobile production industry.

To improve the structure and performance of the existing multi-vehicle type co-production line flexible framing and form a multi-vehicle type co-production line welding automatic production line suitable for our automobile production technology becomes a problem to be solved by the present invention.

SUMMARY

In view of the above deficiencies of the prior art, the present invention aims at providing a multi-vehicle type co-production line flexible framing with a high production efficiency, a fast pace, a wide applicability, and a flexible and convenient use, to satisfy the requirement of the automatic welding production of the automobile body in white.

The present invention is achieved by the following technical scheme:

A multi-vehicle type co-production line flexible framing comprises a robot welding system and a high speed transport system, and further comprises a floor panel intelligent flexible positioning system and a side panel flexible positioning and switching system; the floor panel intelligent flexible positioning system is correspondingly connected to a transfer rail of the high speed transport system, and is responsible for positioning and fixing the floor panel of body; the side panel flexible positioning and switching system is responsible for positioning and fixing the side panel of body and the roof panel of body, and comprises a side panel fixture consolidation system, a fixture storage system, and a fixture switching and rail system, the side panel fixture consolidation system corresponding to the side of the floor panel intelligent flexible positioning system; the fixture storage system is arranged at two sides of the side panel fixture consolidation system in the transfer direction of the high speed transport system; the fixture switching and rail system is connected between the side panel fixture consolidation system and the fixture storage system.

The side panel fixture consolidation system comprises a slide table, a side panel fixture positioning platform, and a base, a support rail for supporting a side panel fixture being set on the slide table; the slide table and the side panel fixture positioning platform are connected to the base, respectively, the side panel fixture positioning platform corresponds to the side of the floor panel intelligent flexible positioning system, and the slide direction of the slide table is perpendicular to the floor panel intelligent flexible positioning system; the side panel fixture positioning platform may position the side panel fixture and a body in white.

The fixture storage system comprises two tetrahedral roll-over tables, which are correspondingly distributed on two sides of the side panel fixture consolidation system in the transfer direction of the high speed transport system, a rotation rail for switching the side panel fixture is set on each station of the tetrahedral roll-over tables, respectively, and the side panel fixture is positioned on the rotation rail.

The fixture switching and rail system comprises four fixture switching dollies, a fixture switching transport rail, and a fixture return rail; the fixture switching transport rail is fixed on the ground, and spliced with the rotation rail on output sites of the two tetrahedral roll-over tables and the support rail of the slide table in the side panel fixture consolidation system; the fixture return rail is fixed in the air, and spliced with the rotation rail on input sites of the two tetrahedral roll-over tables; the fixture switching transport rail, the fixture return rail, the support rail, and the rotation rails on the input and output sites compose a closed rail system; the four fixture switching dollies are correspondingly on the closed rail of the input sites and output sites of the two tetrahedral roll-over tables, respectively.

The fixture switching dollies are rail transfer dollies driven by friction wheels.

The floor panel intelligent flexible positioning system comprises a high speed roller bed and eight intelligent positioning units, the high speed roller bed and eight intelligent positioning units are fixed on the base, respectively, the high speed roller bed corresponds to the high speed transport system, the intelligent positioning units are uniformly distributed on two sides of the high speed roller bed in two columns, and the slide direction of the slide table is perpendicular to the transmission direction of the high speed roller bed.

The intelligent positioning units are a triaxial positioning clamping mechanism, which may clamp the vehicle floor panel from different directions.

Compared with existing technologies, the present invention has some beneficial effects:

1. When producing a same number of vehicle types in the same line, the area occupied by the present invention is the smallest.

2. The number of the welding robots that can be used by the present invention is significantly increased, and the utilization of the framing station is raised.

3. Among all solutions with random switching, the switching time of the present system is the least, the welding time within one welding beat may be increased, and the capacity of the production line is raised.

4. Among all solutions, the structure of the present invention is relatively compact, and costs less.

5. The present invention can satisfy the capacity requirement of 60JPH of the automobile factory.

DETAILED DESCRIPTION OF THE EMBODIMENTS

Figure 1:
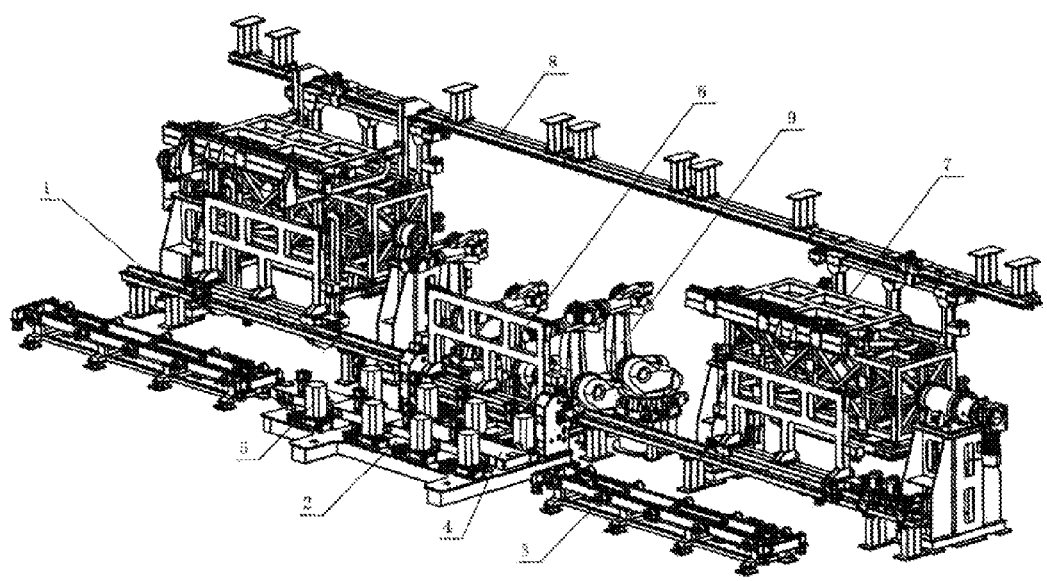
FIG. 1 is a schematic view of a whole structure of the present invention.

The present invention is further described in detail below in connection with the accompanying drawings:

As shown in FIG. 1, a multi-vehicle type co-production line flexible framing described by the present invention comprises a robot welding system 9, a high speed transport system 3, a floor panel intelligent flexible positioning system 2, and a side panel flexible positioning and switching system 1. The robot welding system 9 is used for welding the positioned vehicle body, and is the last execution mechanism of the procedure; the high speed transport system 3 is responsible for transferring the automobile body in white, in order to automatically enter the next procedure from the previous one; the floor panel intelligent flexible positioning system 2 cooperates with the high speed transport system 3, and is responsible for positioning and fixing the floor panel of the body, in order to process the floor panel of body in a flow operation; the side panel flexible positioning and switching system 1 cooperates with the floor panel intelligent flexible positioning system 2, positions and fixes the side panel of body before the automatic welding, and at the same time, keeps a multi-vehicle type co-production line flexible splicing, to improve the applicability of the framing.

The robot welding system 9 is composed of a servo spot welding robot and an adaptive integral servo welding gun. The robot welding system 9 is the implementing system of the welding process, doing the welding by the servo spot welding robot with the servo welding gun, which is the last processing stage of the procedure, and then, the welded automobile body would be automatically sent to the next procedure.

The high speed transport system 3 mainly employs a roller bed and a trolley in mutual cooperation to transport the body in white, wherein the high speed transport process may use a high precision grating encoding ruler and a grating encoder to form a double closed-loop control, the encoding ruler feeds back the position of the trolley, and the encoder feeds back the speed of the trolley. Under the double closed-loop action of the speed and the position, the speed and position precision of the trolley are precisely controlled, and at present, a position precision of ±0.7 mm and a transport beat of 4.7 s may be achieved in this way, both reaching the international advanced level.

The floor panel intelligent flexible positioning system 2 is correspondingly connected to a transfer rail of the high speed transport system 3, and comprises a high speed roller bed 4 and eight intelligent positioning units 5. The side panel flexible positioning and switching system 1 comprises a side panel fixture consolidation system 6, a fixture storage system 7, and a fixture switching and rail system 8. The side panel fixture consolidation system 6 corresponds to the side of the floor panel intelligent flexible positioning system 2, and the fixture storage system 7 is connected with the side panel fixture consolidation system 6 by the fixture switching and rail system 8. The floor panel intelligent flexible positioning system 2 and the side panel flexible positioning and switching system 1 cooperatively accomplish the positioning of the floor panel and side panel of the body in white.

Figure 2:
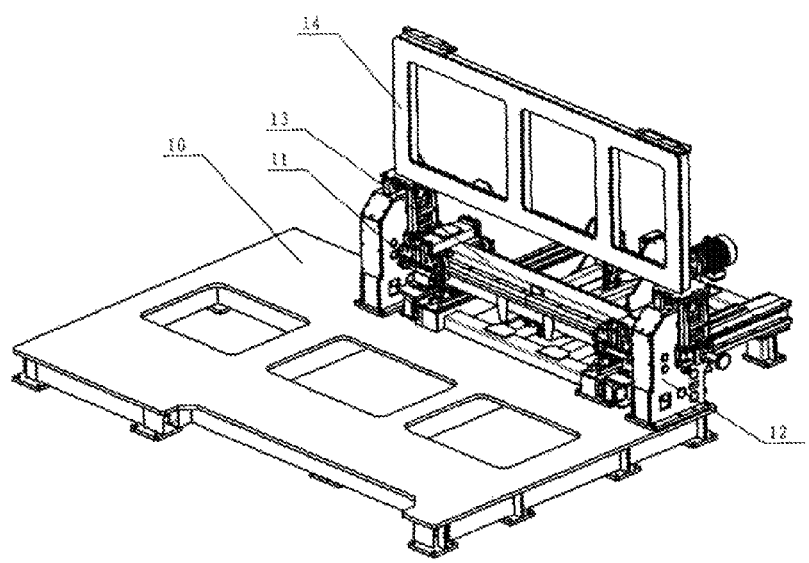
FIG. 2 is a schematic view of a structure of a side panel fixture consolidation system in the present invention.

As shown in FIG. 2, the side panel fixture consolidation system comprises a slide table 11, a side panel fixture positioning platform 12, and a base 10. The side panel fixture positioning platform 12 is fixed on the base 10, corresponds to the side of the floor panel intelligent flexible positioning system, and performs the last three-dimensional position adjustment and control on a side panel fixture 14, ensuring the accuracy of the fixture positioning. The slide table 11 is connected to the base 10, and may slide relative to the base 10. To facilitate the positioning and sliding control, the slide direction of the slide table 11 is perpendicular to the floor panel intelligent flexible positioning system. A support rail 13 for supporting the side panel fixture 14 is set on the slide table 11, and the slide table 11 may transfer the received side panel fixture 14 to the side panel fixture positioning platform 12, and exert a vertical pressure on the side panel fixture 14, ensuring the reliability of the fixture positioning.

Figure 3:
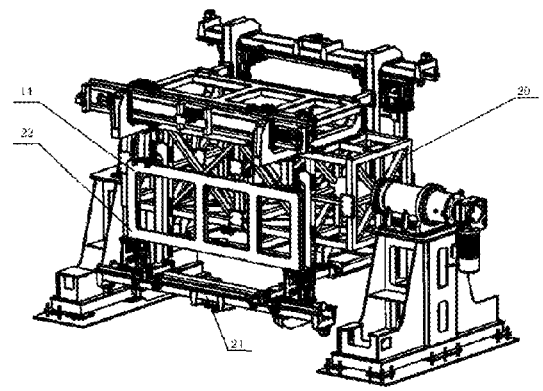
FIG. 3 is a schematic view of a structure of a single tetrahedral roll-over table in the present invention.

The fixture storage system is mainly used for storing standby side panel fixtures, to ensure that the welding process can be carried out efficiently, rapidly, and rhythmically. The fixture storage system comprises two tetrahedral roll-over tables, and since a vacant site is required to replace the side panel fixture at any time, the two tetrahedral roll-over tables may simultaneously carry seven side panel fixtures. The two tetrahedral roll-over tables are correspondingly distributed on two sides of the side panel fixture consolidation system in the transfer direction of the high speed transport system, wherein the vacant site on one tetrahedral roll-over table is used to receive the machining-finished side panel fixture, while the other tetrahedral roll-over table is used to supply a machining-required side panel fixture, and the standby side panel fixtures may be adjusted and replaced at any time through the rolling over of the roll-over table. As shown in FIG. 3, four stations are on one tetrahedral roll-over table 20, a rotation rail 21 for switching the side panel fixture 14 is set on each station, respectively, and the side panel fixture 14 is positioned and connected on the rotation rail 21, wherein the station on the front lower side of the roll-over table 20 is an output site, from which the standby side panel fixture is output. The station on the rear upper side of the roll-over table 20 is an input site for receiving or exchanging a new side panel fixture.

Figure 4:
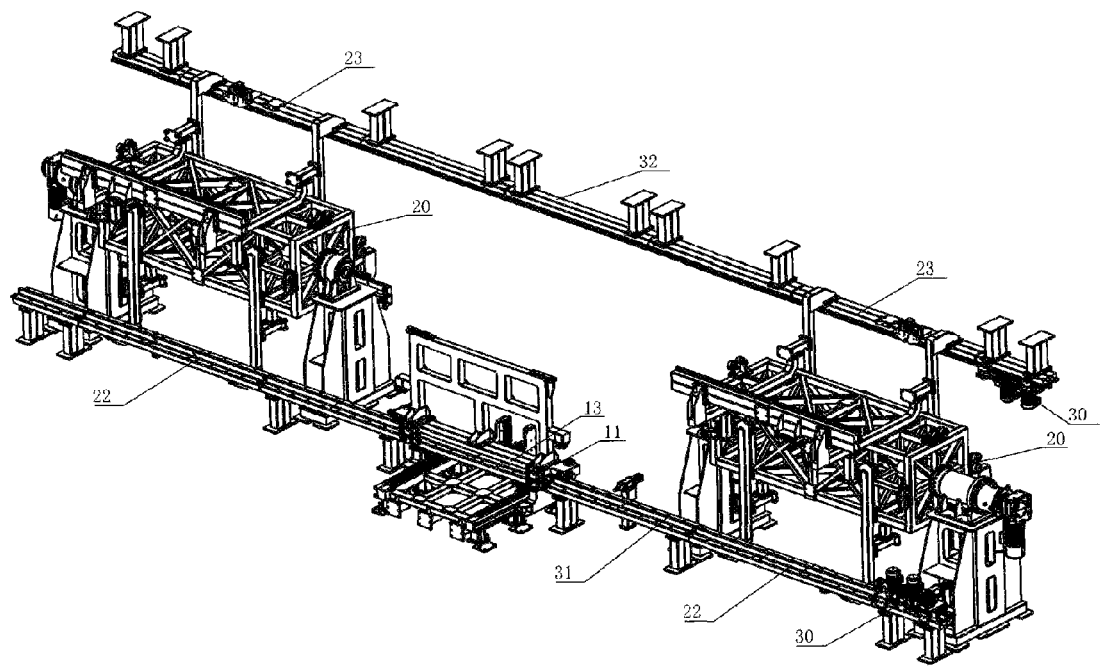
FIG. 4 is a schematic diagram of a combined structure of a fixture switching and rail system and a side panel fixture consolidation system in the present invention.

To ensure that the standby side panel fixture can be replaced smoothly, a fixture switching and rail system is also set between the fixture storage system and the side panel fixture consolidation system. As shown in FIG. 4, the fixture switching and rail system comprises four fixture switching dollies 30, a fixture switching transport rail 31, and a fixture return rail 32. The fixture switching transport rail 31 is fixed on the ground, and spliced with an output rotation rail 22 on the output sites of the two tetrahedral roll-over tables 20 and the support rail 13 of the slide table 11 in the side panel fixture consolidation system; the fixture return rail 32 is fixed in the air, and spliced with an input rotation rail 23 on the input sites of the two tetrahedral roll-over tables 20, thereby forming a closed rail system composed of the fixture switching transport rail 31, the fixture return rail 32, the support rail 13, the input rotation rail 23, and the output rotation rail 22, so that an effective linkage is formed among the systems, which ensures the continuous supply and use of the side panel fixtures. The process of replacing the side panel fixture is powered by the four fixture switching dollies 30, which are rail transfer dollies driven by friction wheels, and put the dolly body in motion by the friction force created by the friction wheels and the rail. The four fixture switching dollies 30 are correspondingly on the closed rail of the input sites and output sites of the two tetrahedral roll-over tables 20, respectively, providing a power support for the process of adjusting and replacing the side panel fixtures at the input and output sites.

Figure 5:
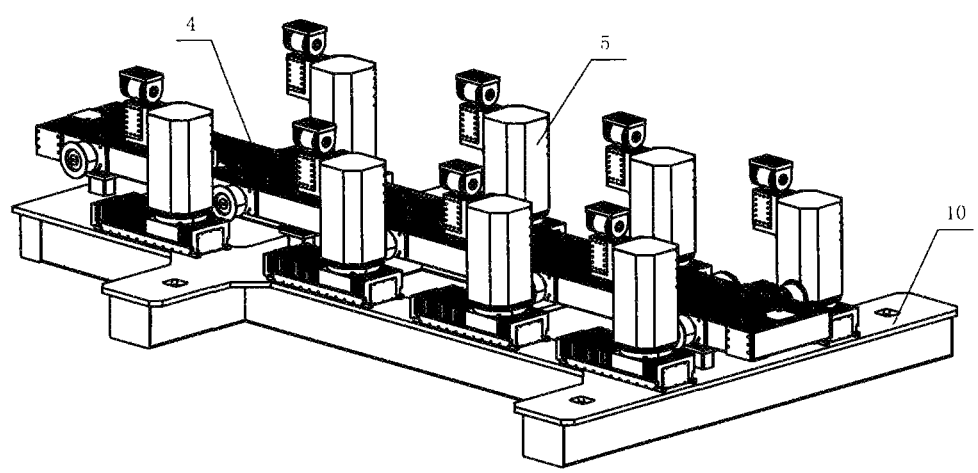
FIG. 5 is a schematic view of a structure of a floor panel intelligent flexible positioning system in the present invention.

As shown in FIG. 5, to maintain coordination and stability, the high speed roller bed 4 and eight intelligent positioning units 5 in the floor panel intelligent flexible positioning system are fixed on the base 10 of the side panel fixture consolidation system, respectively, the high speed roller bed 4 corresponds to the high speed transport system, for receiving the floor panel of the body in white in transfer, and the slide direction of the slide table in the side panel fixture consolidation system is perpendicular to the transmission direction of the high speed roller bed 4. The intelligent positioning units 5 are uniformly distributed on two sides of the high speed roller bed 4 in two columns, and are a triaxial positioning clamping mechanism, which performs a three-dimensional position adjustment on the received floor panel of the body in white, to satisfy the positioning requirement of different vehicle types, and ensure the positioning process to go smoothly.

As shown in FIGS. 1 and 4, in actual work, the floor panel of the body in white is firstly transferred to the high speed roller bed 4 by the high speed transport system 3, and positioned after the position adjustment made by the triaxial positioning clamping mechanism of the intelligent positioning units 5; then, the side panel fixture on the output site of the tetrahedral roll-over table 20 is transported to the support rail 13 of the slide table 11 via a respective fixture switching dolly and the fixture switching transport rail 31, the slide table 11 transfers the received side panel fixture to the side panel fixture positioning platform in the vertical direction, the side panel fixture positioning platform performs the last position adjustment and positioning on the side panel fixture, and then the positioning of the side panel fixture and the floor panel of the body in white is finished. The robot welding system 9 welds the floor panel and the side panel, and with this, the process of welding the body in white is finished. Finally, the side panel fixture positioning platform opens, and the side panel fixture retreats back along with the slide table 11, and is spliced with the fixture switching transport rail 31 again. The side panel fixture is sent back to the vacant site of the tetrahedral roll-over table 20 under the action of the fixture switching dolly. At the same time, after the intelligent positioning units 5 open, the welded body in white is put onto the high speed roller bed 4, and transferred to the next machining site via the high speed transport system 3, and then, the process of welding the body in white is finished.

Since seven different side panel fixtures may be simultaneously carried on the two tetrahedral roll-over tables, the fixture switching process may be performed synchronously in the welding process. For example, when the system receives a factory instruction of using the vehicle type B, the system firstly identifies the vehicle type B fixture, and then determines the specific location for storing the vehicle type B fixture and whether the vehicle type B fixture is on the output site for fixture switching, and at the same time, determines whether the other output site is a vacant site. If no, the system issues an instruction for the tetrahedral roll-over tables to rotate the side panel fixture with the vehicle type B to one of the output sites, and at the same time, rotate the vacant site to the other output site. The vacant site is used to receive the side panel fixture at work, and the side panel fixture for the vehicle type B is used as the standby fixture for the next turn. With this, the adjustment of the side panel fixture is finished, with no impact on the normal automatic welding process. Of course, if it need to adjust the position of two standby side panel fixtures, the fixture return rail and the vacant site on the output site may also be used to adjust the position of the side panel fixtures between the two tetrahedral roll-over tables, thereby significantly increasing the flexibility and convenience of using the side panel flexible positioning and switching system, and truly realizing a multi-vehicle type co-production line flexible assembly.

The invention claimed is:

1. A multi-vehicle type co-production line flexible framing, comprising:
   a robot welding system and a high speed transport system, wherein the multi-vehicle type co-production line flexible framing further comprises a floor panel intelligent flexible positioning system and a side panel flexible positioning and switching system; wherein the floor panel intelligent flexible positioning system is correspondingly connected to a transfer rail of the high speed transport system and is configured to position and to switch the floor panel of a vehicle body; wherein the side panel flexible positioning and switching system is configured to position and to fix the side panel of the vehicle body and the roof panel of the vehicle body; wherein the side panel flexible positioning and switching system further comprises a side panel fixture consolidation system, a fixture storage system, and a fixture switching and rail system, the side panel fixture consolidation system being arranged on the side of the floor panel intelligent flexible positioning system; wherein the fixture storage system is arranged on two sides of the side panel fixture consolidation system in the transfer direction of the high speed transport system; wherein the fixture switching and rail system is connected between the side panel fixture consolidation system and the fixture storage system;
   wherein the side panel fixture consolidation system further comprises a slide table, a side panel fixture positioning platform, and a base;
   wherein the fixture switching and rail system further comprises four fixture switching dollies, a fixture switching transport rail, and a fixture return rail;
   wherein the fixture storage system comprises two tetrahedral roll-over tables;
   wherein the fixture switching transport rail is fixed on the ground and spliced with a rotation rail on output sides of the two tetrahedral roll-over tables and a support rail of the slide table in the side panel fixture consolidation system;
   wherein the fixture return rail is fixed in the air and spliced with the rotation rail on input sides of the two tetrahedral roll-over tables;

wherein the fixture switching transport tail, the fixture return rail, the support rail, and the rotation rails on the input and output sites compose a closed rail system;

wherein the four fixture switching dollies are on the corresponding closed rail of the input sites and output sites of the two tetrahedral roll-over tables, respectively.

2. The multi-vehicle type co-production line flexible framing according to claim 1, wherein the support rail for supporting a side panel fixture is set on the slide table; wherein the slide table and side panel fixture positioning platform are connected to the base, respectively; wherein the side panel fixture positioning platform is arranged on the side of the floor panel intelligent flexible positioning system and the slide direction of the slide table is perpendicular to the floor panel intelligent flexible positioning system; wherein the side panel fixture positioning platform positions the side panel fixture and a body in white.

3. The multi-vehicle type co-production line flexible framing according to claim 1, wherein the two tetrahedral roll-over tables are correspondingly distributed on two sides of the side panel fixture consolidation system in the transfer direction of the high speed transport system, wherein a rotation rail for switching the side panel fixture is set on each station of the tetrahedral roll-over tables, respectively, wherein the side panel fixture is positioned on the rotation rail.

4. The multi-vehicle type co-production line flexible framing according to claim 1, wherein the fixture switching dollies are rail transfer dollies driven by friction wheels.

5. The multi-vehicle type co-production line flexible framing according to claim 1, wherein the floor panel intelligent flexible positioning system comprises a high speed roller bed and eight intelligent positioning units, wherein the high speed roller bed and eight intelligent positioning units are fixed on the base, respectively, wherein the intelligent positioning units are uniformly distributed on two sides of the high speed roller bed in two columns, wherein the slide direction of the slide table is perpendicular to the transmission direction of the high speed roller bed.

6. The multi-vehicle type co-production line flexible framing according to claim 5, wherein the intelligent positioning units are a triaxial positioning clamping mechanism which clamps the vehicle floor panel from different directions.

* * * * *